United States Patent [19]

Koyama

[11] Patent Number: 4,780,658
[45] Date of Patent: Oct. 25, 1988

[54] CONTROL SYSTEM FOR INDUCTION MOTOR

[75] Inventor: Masato Koyama, Hyogo, Japan

[73] Assignee: Mitsubishi Denki Kabushiki Kaisha, Tokyo, Japan

[21] Appl. No.: 810,667

[22] Filed: Dec. 18, 1985

[30] Foreign Application Priority Data

Feb. 5, 1985 [JP] Japan .................................. 60-20421

[51] Int. Cl.$^4$ .............................................. H02P 5/40
[52] U.S. Cl. ..................................... 318/808; 318/805
[58] Field of Search ............................... 318/800–803, 318/805, 807–811, 812

[56] References Cited

U.S. PATENT DOCUMENTS 3,824,437  7/1974  Blaschke .
4,330,741  5/1982  Nagase et al. ........................ 318/808

OTHER PUBLICATIONS

Abbondanti, A. "Method of Flux Control in Induction Motors Driven by Variable Frequency, Variable Voltage Supplies", PTO Mailroom Jul. 6, 1981.

Gerces, L. J., "Parameter Adaption for the Speed-Controlled Static AC Drive with a Squirrel-Cage Induction Motor", IEEE Transactions on Industry Applications, vol. 1A-16, No. 2 Mar./Apr. 1980 pp. 173–178.

Primary Examiner—David Smith, Jr.
Attorney, Agent, or Firm—Wolf, Greenfield & Sacks

[57] ABSTRACT

A control system for an induction motor includes a power presumption circuit for presuming an electric energy $\hat{F}_o$, which is associated with a reactive power generated in the induction motor, on the basis of the numerical constants including the secondary winding resistance, the actual primary current and the actual rotation speed or angle of the induction motor. The electric energy $\hat{F}_o$ is used to compensate for the change of the numerical constants of the induction motor, which is caused by the change in temperature.

2 Claims, 7 Drawing Sheets

CONTROL SYSTEM FOR INDUCTION MOTOR

BACKGROUND OF THE INVENTION

1. Field of the Invention

The present invention relates to a control system for controlling the torque of an induction motor by means of the current and frequency thereof.

2. Prior Art

Figure 1:
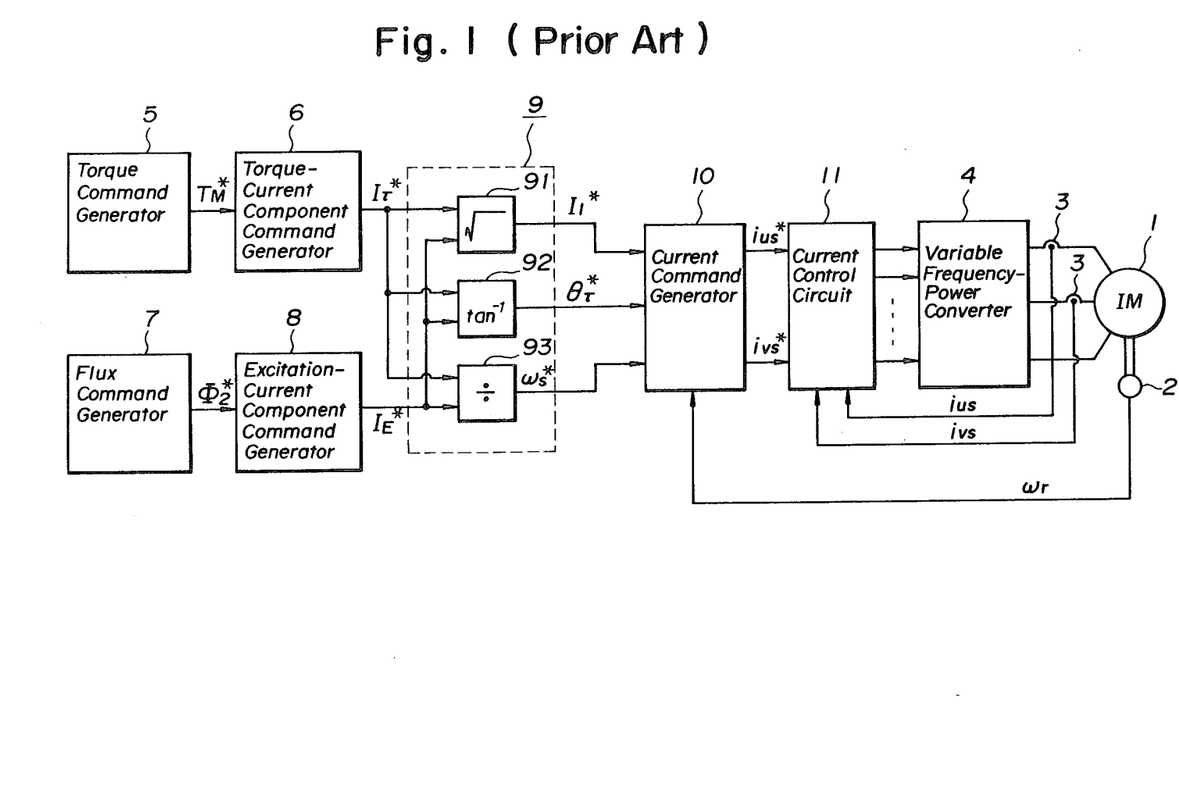
FIG. 1 shows a block diagram of a conventional control system of an induction motor.

FIG. 1 shows a conventional control system for an induction motor. In the drawing, there are shown an induction motor 1, a rotation detector 2 for detecting the rotation speed of the induction motor 1, a current detector 3 for detecting the primary current of the induction motor 1, a variable frequency-power converter unit 4 for driving the induction motor 1 by means of variable frequencies, a torque command generator 5 for generating a torque command $T_M^*$, a torque-current component command generator 6 for receiving the torque command $T_M^*$ and generating a torque-current component command $I_{96}^*$ having a predetermined correspondence therebetween, a flux command generator 7 for generating a secondary magnetic-flux command $\Phi_2^*$, an excitation-current component command generator 8 for receiving the secondary flux command $\Phi_2^*$ and generating an excitation-current component command $I_E^*$ having a predetermined correspondence therebetween, a current-vector arithmetic circuit 9 for receiving the torque-current component command $I_T^*$ and the excitation-current component command $I_E^*$ and for generating a primary-current amplitude command $|I_I^*|$, a phase command $\theta_{96}^*$ and a slip angle frequency command $\omega_s^*$, as computed below, which are applied to the induction motor 1, a current command generating circuit 10 for receiving the output signal from the current-vector arithmetic circuit 9 and the rotation speed $\omega_r$ from the rotation detector 2 and for computing primary-current commands which are applied to the induction motor 1, and a current control circuit 11 for receiving the output signals from the current command generating circuit 10 and the output signal from the current detector 3 and for generating control signals applied to the variable frequencypower converter 4.

The current-vector arithmetic circuit 9 comprising circuits 91 to 93 performs the following operation:

$$|I_1^*| = \sqrt{I_E^{*2} + I_T^{*2}} \tag{1}$$

$$\theta_T^* = \tan^{-1}(I_T^*/I_E^*) \tag{2}$$

$$\omega_s^* = \frac{1}{T_2} \cdot \frac{I_T^*}{I_E^*} \tag{3}$$

where $T_2 = L_2/R_2$, $R_2$ and $L_2$ are a secondary winding resistance and a secondary winding inductance, respectively, of the induction motor 1.

In order to generate the primary current commands $i_{us}^*$ and $i_{vs}^*$ which are respectively applied to the u phase winding and the v phase winding of the induction motor 1, the current command generating circuit 10 performs the following operation:

$$\begin{cases} i_{us}^* = |I_1^*| \cdot \cos(\omega_0 t + \theta_T^*) \\ i_{vs}^* = |I_1^*| \cdot \cos\left(\omega_0 t + \theta_T^* - \frac{2}{3}\pi\right) \end{cases} \tag{4}$$

where $\omega_0 = \omega_r + \omega_s^*$ \hfill (5)

In the current control circuit 11, the primary current commands $i_{us}^*$ and $i_{vs}^*$ are compared with the actual primary currents $i_{us}$ and $i_{vs}$, respectively, from the primary current detectors 3 so that the waveforms of the current commands are correspondingly coincident with those of the actual primary currents, and then the control signals are operated for application to the variable frequency-power converter 4.

At this time, with respect to the primary current flow through the w phase winding, the primary current commands $i_{ws}^*$ and $i_{ws}$ can also be controlled is the same manner as the primary currents $i_{us}$ and $i_{vs}$, and be computed by the following:

$$i_{ws}^* = -(i_{us}^* + i_{vs}^*) \tag{6}$$

$$i_{ws} = -(i_{us} + i_{vs}) \tag{7}$$

In general, a control system in which the primary current commands $i_{us}^*$, $i_{vs}^*$ and $i_{ws}^*$ are computed by the formulas (1) through (6) as described above and the actual primary currents $i_{us}$, $i_{vs}$ and $i_{ws}$ are controlled to coincide with the corresponding commands may be called "a vector control method". In this method, assuming that the excitation-current component command $I_E^*$ is fixed, it is known that the torque of the induction motor 1 changes in proporton to the torque-current component command $I_T^*$ and the variable speed control of the induction motor can therefore be effected in a stable manner and such as to provide a relatively high speed response.

According to this control system, it is noted that, as understood from the formula (3), the values of the secondary winding resistance $R_2$ and the secondary winding inductance $L_2$ which are the numerical constants of the induction motor 1 are required to operate the primary current command. Since the secondary winding resistance $R_2$ is under the influence of temperature, if any one of the values $R_2$, $T_2 = L_2/R_2$ in the current vector arithmetic circuit 9 is corrected by a certain means, the linearity of a torque-to-torque current component command $I_T^*$ characteristic may be damaged and furthermore it may be impossible to control the torque or secondary flux of the induction motor 1 in response to the respective commands.

Figure 2:
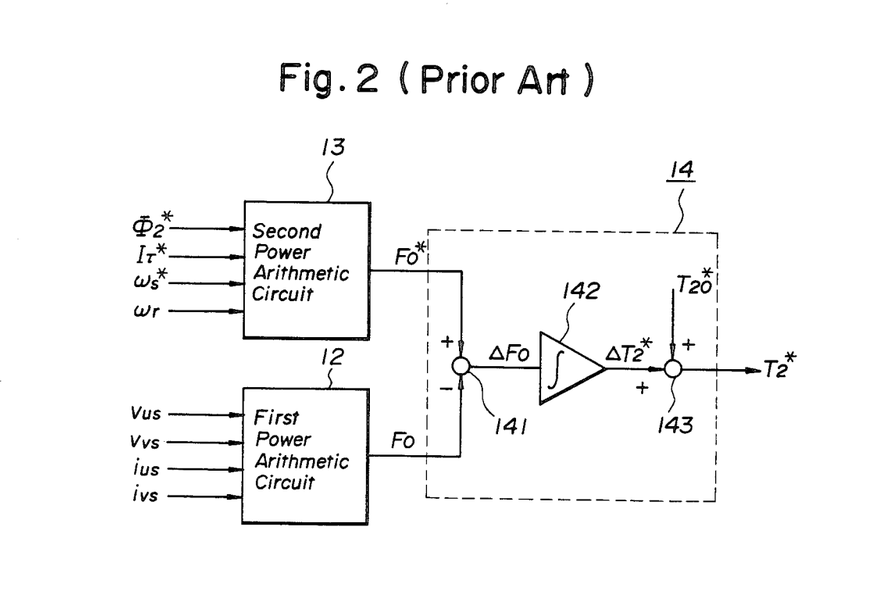
FIG. 2 shows a block diagram of a conventional circuit for compensating for changes in temperature of the secondary-winding resistance of the induction motor.

A circuit which, for example, compensates for the change in temperature of the secondary winding resistance $R_2$ is shown in FIG. 2. The detailed compensation circuit is disclosed in the publication "IEEE Trsns. IA Vol. IA-16, No. 2, pp 173-178, 1980".

In FIG. 2, there are shown a first power arithmetic circuit 12 for receiving the primary voltages $v_{us}$ and $v_{vs}$ and the primary currents $i_{us}$ and $i_{vs}$ of the induction motor 1 and for detecting an electric energy $F_o$, as computed below, which is associated with a reactive power generated in the induction motor 1, a second power arithmetic circuit 13 for receiving the secondary flux command $\Phi_2^*$, the torque-current component command $I_T^*$, the slip angle frequency command $\omega_s^*$ and the rotation speed $\omega_r$ of the induction motor and for computing an electric energy $F_o^*$, as described below, which corresponds to the electric energy $F_o$, and a compensation circuit 14.

The operation formulas and the compensation method of the electric energies $F_o$ and $F_o^*$ will next be explained. Note that the numerical constants in the control circuits, such as the current-vector arithmetic circuit 9, of the induction motor 1 will be marked with asterisks (for example, $R_2^*$).

As is known by those skilled in the art, the voltage equations of the stator or primary side of the induction motor on a d-q axis coordinate system are given by $$\begin{cases} v_{ds} = (R_1 + PL_1\sigma)i_{ds} + \frac{M}{L_2} p\Phi_{2d} \\ v_{qs} = (R_1 + PL_1\sigma)i_{qs} + \frac{M}{L_2} P\Phi_{2q} \end{cases} \quad (8)$$

where $v_{ds}$ and $v_{qs}$ are the d axis and q axis components, respectively, of the primary voltage;

$i_{ds}$ and $i_{qs}$ are the d axis and q axis components, respectively, of the primary current;

$\Phi_{2d}$ and $\Phi_{2q}$ are the d axis and q axis components, respectively, of the secondary flux;

P=d/dt is a differential operator; and $R_1$, $L_1$, M and $L_2$ are the primary winding resistance, the primary winding inductance, the primary-secondary winding mutual inductance and the secondary winding inductance, respectively, of the induction motor.

In addition, a leakage coefficient $\sigma$ is given by $$\sigma = 1 - \frac{M}{L_1 L_2} \quad (9)$$

Using the formula (8), the reactive power Q is represented by the following:

$$\begin{aligned} Q &= v_{ds} \cdot i_{qs} - v_{qs} \cdot i_{ds} \\ &= \frac{M}{L_2} (i_{qs}P\Phi_{2d} - i_{ds}P\Phi_{2q}) + L_1\sigma(i_{qs}Pi_{ds} - i_{ds}Pi_{qs}) \end{aligned} \quad (10)$$

On the other hand, as is well known, if the primary currents of the induction motor are controlled in accordance with the formulas (1) through (6) then the following can be obtained:

$$\begin{cases} i_{ds}^* = I_E^* \cos \omega_o t - I_T^* \sin \omega_o t \\ i_{qs}^* = I_E^* \sin \omega_o t + I_T^* \cos \omega_o t \end{cases} \quad (11)$$

$$\begin{cases} \Phi_{2d}^* = \Phi_2^* \cos \omega_o t \\ \Phi_{2q}^* = \Phi_2^* \sin \omega_o t \end{cases} \quad (12)$$

where $i_{ds}^*$, $i_{qs}^*$, $\Phi_{2d}^*$ and $\Phi_{2q}^*$ are the commands $i_{ds}$, $i_{qs}$, $\Phi_{2d}$ and $\Phi_{2q}$, respectively, and $\omega_o$ is given by the formula (5).

Note that the formula (11) can be obtained by cancelling the primary current commands $i_{us}^*$ and $i_{vs}^*$ from the formulas (1) through (4) and the formula (16) as described below.

Using the formulas (11) and (12), the following can be obtained:

$$\frac{M^*}{L_2^*} (i_{qs}^* P\Phi_{2d}^* - i_{ds}^* P\Phi_{2q}^*) = \frac{M^*}{L_2^*} (I_T^* P\Phi_2^* - \omega_o I_E^* \Phi_2^*) \quad (13)$$

By the formula (10), a formula corresonding to the formula (13) is as follows:

$$\frac{M}{L_2} (i_{qs}P\Phi_{2d} - i_{ds}P\Phi_{2q}) = Q - L_1\sigma(i_{qs}Pi_{ds} - i_{ds}Pi_{qs}) \quad (14)$$

Thus, the formula (14) is not affected by the change in temperature of the secondary winding resistance $R_2$ and can be easily computed by using the primary voltages and the primary currents of the induction motor, because it does not include the resistance $R_2$.

Alternatively, although the formula (13) does not include the secondary winding resistance $R_2$ per se, all of $I_E^*$, $I_T^*$ and $\Phi_2^*$ denote the command values. This means that, if the value $R_2^*$ does not coincide with the actual value $R_2$, the excitation current $I_E$, the torque current $I_T$ and the secondary flux $\Phi_2$ do not coincide with the respective commands.

It is understood, therefore, that there is a deviation between the value computed by the formula (13) and the value computed by the formula (14). Conclusively, the command value $R_2^*$ or $T_2^*$ in the current-vector arithmetic circuit 9 can be corrected so that the deviation becomes zero. In FIG. 2, the value $T_2^*$ is corrected on the basis of the principle above.

Now, as is known, the relationship among the d axis and q axis components $v_{ds}$ and $v_{qs}$ of the primary voltage, the primary volatges $v_{us}$ and $v_{vs}$, and the d axis and q axis components $i_{ds}$ and $i_{vs}$ of the primary current is given by $$\begin{cases} v_{ds} = \sqrt{\frac{3}{2}} v_{us} \\ v_{qs} = \frac{1}{\sqrt{2}} v_{us} + \sqrt{2} v_{vs} \end{cases} \quad (15)$$

$$\begin{cases} i_{ds} = \sqrt{\frac{3}{2}} i_{us} \\ i_{qs} = \frac{1}{\sqrt{2}} i_{us} + \sqrt{2} i_{vs} \end{cases} \quad (16)$$

By inserting the formulas (15) and (16) into the right member of the formula (14) and cancelling the d axis and q axis components $v_{ds}$ and $v_{qs}$ of the primary voltage and the d axis and q axis components $i_{ds}$ and $i_{qs}$ of the primary current, the operation formula of the electric energy $F_o$ is calculated as follows:

$$\begin{aligned} F_o &= \sqrt{3} (v_{us}i_{vs} - v_{vs}i_{us} - L_1\sigma i_{vs}Pi_{us} + L_1\sigma i_{us}Pi_{vs}) \\ &= \sqrt{3} [(v_{us} - L_1\sigma Pi_{us})i_{vs} - (v_{vs} - L_1\sigma Pi_{vs}) i_{us}] \end{aligned} \quad (17)$$

Also, according to the right member of the formula (13), the operation formula of the electric energy $F_o^*$ is given by $$F_o^* = \frac{M^*}{L_2^*}(I_\tau^* P\Phi_2^* - \omega_o I_E^* \Phi_2^*) \quad (18)$$

The operation of the compensation circuit shown in FIG. 2 will next be explained.

First, as the output signals from the first and second power arithmetic circuits 12 and 13, the electric energies $F_o$ and $F_o^*$ are obtained by computing each of the formulas (17) and (18).

Second, a subtractor 141 outputs a deviation $\Delta F_o$ between the electric energies $F_o^*$ and $F_o$, which is integrated by an integrator 142 to obtain an amount of correction $\Delta T_2^*$ for a numerical constant setting value $T_2^*$. The amount of correction $\Delta T_2^*$ and a preset amount $T_{20}^*$ for the value $T_2^*$ are added by an adder 143 to thereby obtain a corrected value $T_2^*$.

As the result, in FIG. 1, the value $T_2^*$ is corrected in the current-vector arithmetic circuit 9 and therefore the linearity between the torque-current component command $I_\tau^*$ and the torque can be maintained, even if any change of the secondary winding resistance $R_2$ is caused by the change in temperature.

As the conventional control system of the induction motor is constructed as described above, under the operating condition, the value of the secondary winding resistance in the control circuit of the induction motor has been compensated for with respect to the change in temperature thereof and the command values such as the excitation-current component command $I_E^*$ or the torque-current component command $I_\tau^*$ have been utilized to compute the electric energy $F_o^*$ used in the compensation circuit.

Due to the deviation or difference between the actual and command values of the primary current, which is caused by a characteristic of the current control circuit wherein the actual values $i_{us}$, $i_{vs}$ and $i_{ws}$ of the primary currents are controlled to coincide with the respective commands, or the limitation of the variable frequency-power converter, such as the withstand current or the withstand voltage, if the control system is saturated under a certain operating condition then it may be impossible to apply the excitation-current component $I_E$ and the torque-current component $I_\tau$ to the induction motor in response to the corresponding commands, even if the value of the secondary winding resistance is properly corrected.

In this case, a problem has been experienced wherein any deviation that occurs between the electric energies $F_o^*$ and $F_o$ causes the compensation circuit to provide a wrong correction, despite the properly corrected value of the secondary winding resistance.

SUMMARY OF THE INVENTION

The disadvantages or problems as described above can be overcome by the present invention.

It is an object of the present invention, therefore, to provide an improved control system for an induction motor which is not influenced by the saturation in the control system which may be caused by the current control deviation resulting from the characteristic of the current control circuit or the limitation of the variable frequency-power converter, such as the withstand current or the withstand voltage, and which is capable of correctly compensating for changes of the secondary winding resistance which may be caused by changes in temperature.

Another object of the present invention is to provide a control system for an induction motor in which there is provided a presumption circuit for presuming an electric energy $\hat{F}_o$ corresponding to the electric energy $F_o$ from the numerical constants including the secondary winding resistance of the induction motor and the actual primary current and the actual rotation speed of the induction motor, the presumption circuit being used as a circuit for compensating for the change in temperature of the secondary winding resistance.

Another object of the present invention is to provide a control system for an induction motor, which comprises a rotation detector for detecting the rotational speed or the angular velocity of the induction motor; a variable frequency-power converter for driving the induction motor by means of variable frequencies; a current-vector arithmetic circuit for computing a primary current, as an amount of vector, which is applied to the induction motor, by using a functional relationship based on the numerical constants of the induction motor and for outputting at least either of a slip frequency and a slip angle; a current command generating circuit for computing the command value of the primary current from the output signal of the current-vector arithmetic circuit and the output signal of the rotation detector; a current control circuit for generating a control signal, which is applied to the variable frequency-power converter, in response to the output signal of the current command generating circuit; a primary current detector for detecting the primary current of the induction motor; a power arithmetic circuit for detecting an electric energy associated with a reactive power which is generated in the induction motor; a power presumption circuit for presuming the electric energy; and a compensation circuit for comparison between the output signal of the power arithmetic circuit and the output signal of the power presumption circuit and for generating a numerical constant signal in response to the comparison to thereby compensate for both the parameters in the power presumption circuit and the numerical constants of the induction motor in the current-vector arithmetic circuit.

According to the control system for the induction motor of the present invention, there is provided therein a power presumption circuit for presuming an electric energy $\hat{F}_o$ corresponding to the electric energy $F_o$ on the basis of the numerical constants of the induction motor, including the secondary winding resistance, the actual primary current of the induction motor and the actual rotation speed thereof, whereby the change of the secondary winding resistance caused by the change in temperature can be accurately corrected.

According to the present invention, the electric energies associated with the reactive power induced in the induction motor are computed by both the first system which is influenced by the secondary winding resistance and the second system which is not influenced thereby, and the computed deviation between the first and second systems is applied to the arithmetic circuit in the second system and the control circuit of the induction motor so that the values of the second winding resistance in those circuits are corrected. It is apparent, therefore, that the remarkably high thermal compensation for the secondary winding resistance can be effected throughout the operating conditions of the induction motor, including the stop condition.

These and other objects and advantages of the present invention will appear more clearly from the follow-

PREFERRED EMBODIMENTS OF THE INVENTION

Figure 3:
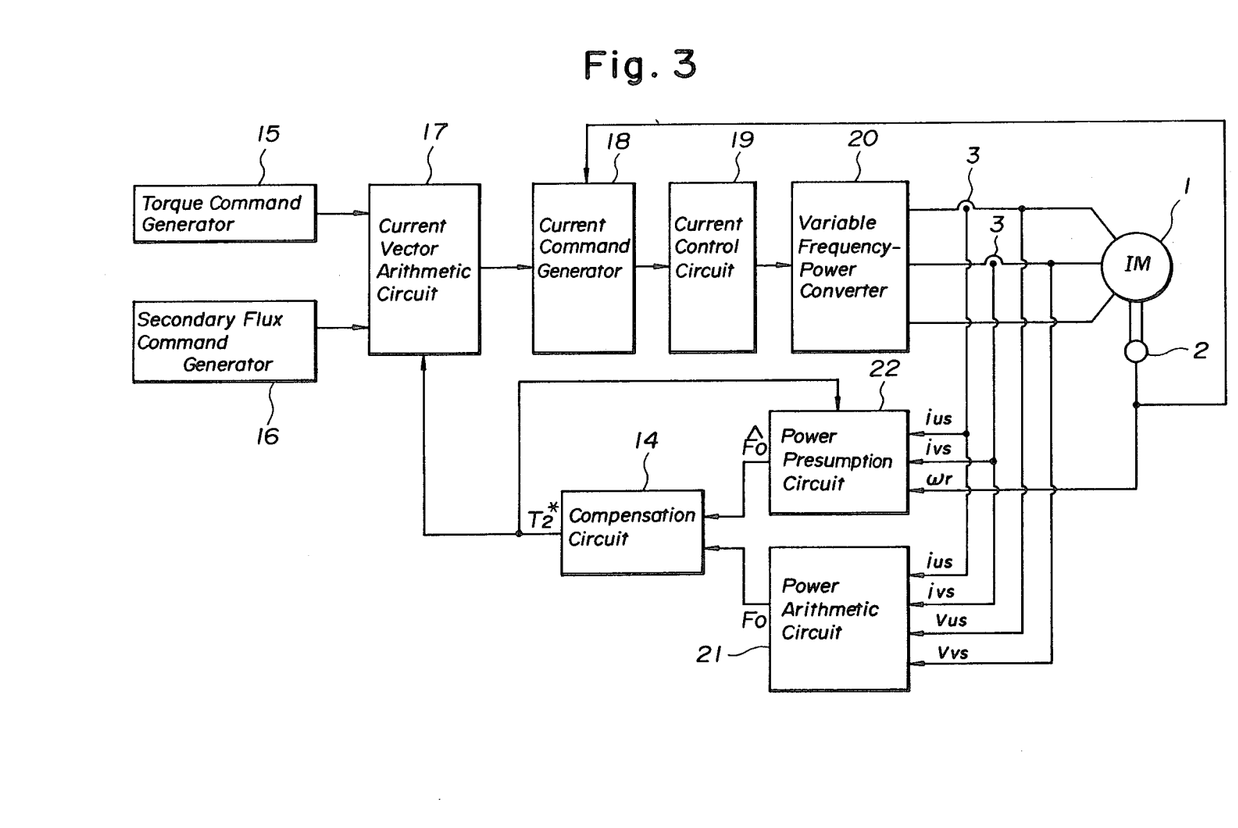
FIG. 3 shows a block diagram of a control system for an induction motor in accordance with one preferred embodiment of the present invention.

FIG. 3 shows one embodiment of the present invention. In the drawing, the same numbers 1, 2, 3, and 14 are used to designate elements similar to those in FIG. 1 illustrating a conventional control system, and there are also shown a torque command generator or torque-current component command generator 15; a secondary flux command generator or excitation-current component command generator 16; a current-vector arithmetic circuit 17 such as the circuit 9 in FIG. 1; a current command generating circuit 18 such as the circuit 10 in FIG. 1; a current control circuit 19 such as the circuit 11 in FIG. 1; a variable frequency-power converter unit 20 which is in the form of a solid-state switching circuit comprising a plurality of solid-state switching elements connected between a power source (not shown) and the induction motor 1, and which may be an inverter circuit or a cyclo-converter circuit; a power arithmetic circuit 21 such as the circuit 12 in FIG. 1; and a power presumption circuit 22.

Figure 4:
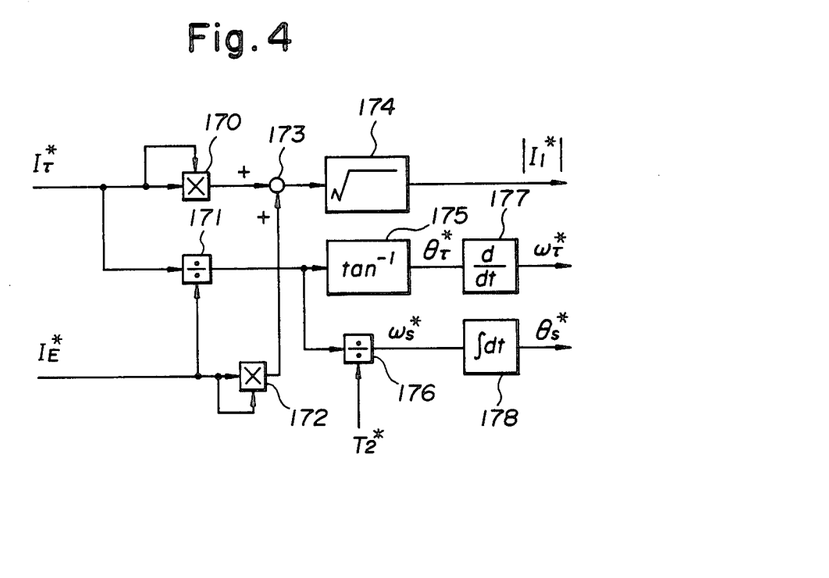
FIGS. 4 and 5 show examples of a current-vector arithmetic circuit in the embodiment shown in FIG. 3.

FIG. 4 shows an example of the current-vector arithmetic circuit 17 in the embodiment shown in FIG. 3. As shown in FIG. 4, the calculation of the formula (1) is performed by two multipliers 170 and 172, an adder 173, and a function generator 174 to obtain the primary-current amplitude command $|I_1^*|$.

The value of $I_T^*/I_E^*$, which is calculated by a divider 171, is applied to a function generator 175 which outputs the phase command $\theta_T^*$ of the formula (2). The quotient or output signal of the divider 171 is applied to a divider 176 which divides the quotient signal of the divider 171 by the numerical constant setting value $T_2^*$, and outputs the slip-angle frequency command $\omega_s^*$ of the formula (3). The differential value $\omega_T^*$ of the phase command $\theta_T^*$ is outputted from a differentiator 177 which is connected to the output of the function generator 175 and the integral value $\theta_s^*$ of the slip-angle frequency command $\omega_s^*$, or the slip-angle command is outputted from an integrator 178 which is connected to the output of the divider 176.

Figure 5:
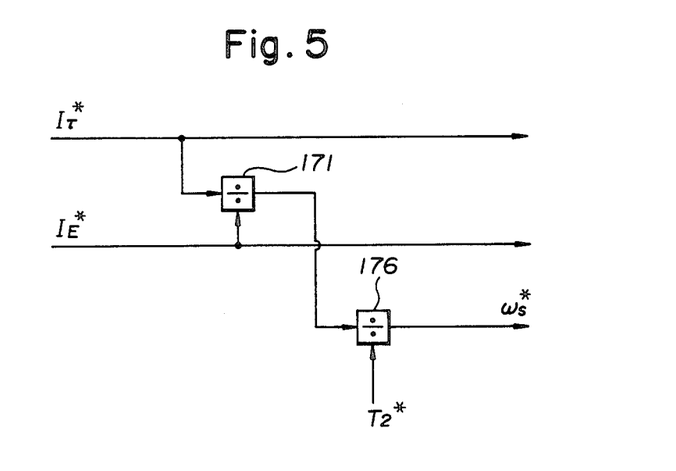

FIG. 5 shows another example of the current-vector arithmetic circuit 17 in the embodiment shown in FIG. 3. Although in this example the calculation portion of the slip-angle frequency command $\omega_s^*$ is the same as that of FIG. 4, there is a difference therebetween in that the excitation-current component command $I_E^*$ and the torque-current component command $I_T^*$ are directly outputted without any computation of the primary-current amplitude command $|I_1^*|$ and the phase command $\theta_T^*$.

Figures 6, 7:
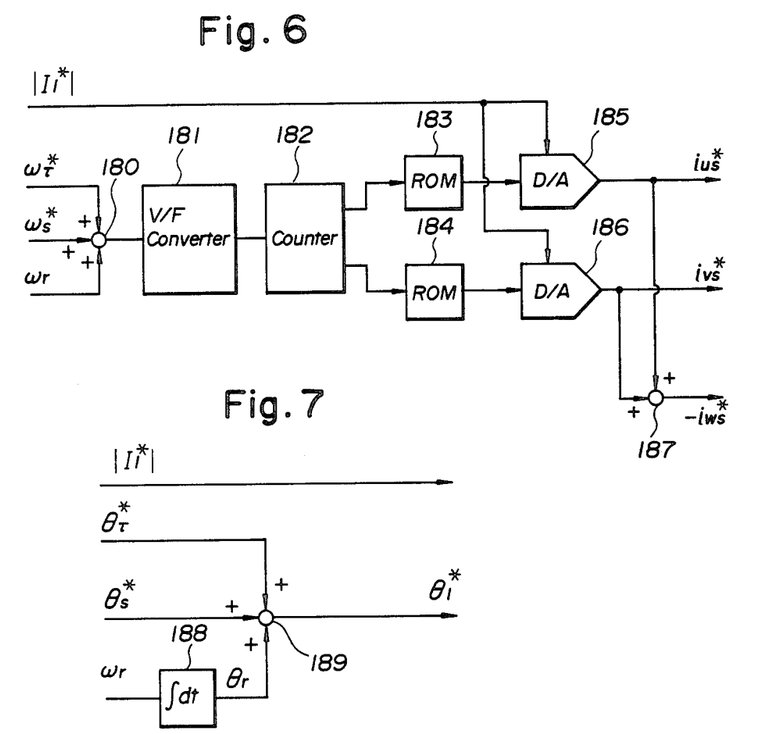
FIGS. 6 and 7 show examples of a current command generating circuit in the embodiment shown in FIG. 3.

FIG. 6 shows a example of the current command generating circuit 18 in the embodiment shown in FIG. 3, which is a circuit for calculating the momentary 3-phase primary-current commands $i_{us}^*$, $i_{vs}^*$, and $i_{ws}^*$ by performing a calculation using the formula (4).

As shown in FIG. 6, the differential value $\omega_T^*$, the slip-angle frequency command $\omega_s^*$, and the rotational-angle frequency $\omega_r$ of the induction motor are added by an adder 180, the output of which being applied to a V/F converter 181 to obtain a train of pulses proportional to the magnitude of $\omega_r + \omega_s^* + \omega_T^*$. The train of pulses is counted by a counter 182 which outputs the phase $(\omega_r + \omega_s^* + \omega_T^*)$, that is, $[(\omega_r + \omega_s^*)t + \theta_T^*]$, as a digital quantity.

The output signals from the counter 182 are used to address ROMs 183 and 184 in which the values of $\cos(\omega_0 t + \theta_T^*)$ and $\cos(\omega_0 t + \theta_T^* - \frac{2}{3}\pi)$, (where $\omega_0 = \omega_r + \omega_s^*$), are respectively stored. The digital values representing the sine-wave signals $\cos(\omega_0 t + \theta_T^*)$ and $\cos(\omega_0 t + \theta_T^* - \frac{2}{3}\pi)$, which are read out from the ROMs 183 and 184, respectively, are applied to corresponding D/A converters 185 and 186, which each have a multiplying function also, and are multiplied by the primary-current amplitude command $|I_1^*|$ which is applied to the D/A converters 185 and 186, so that the primary-current commands $i_{us}^*$ and $i_{vs}^*$ are respectively outputted therefrom. Also, the primary-current command $i_{ws}^*$ is outputted from an adder 187 which receives the primary-current commands $i_{us}^*$ and $i_{vs}^*$, and which performs the calculation of the formula (6).

FIG. 7 shows another example of the current command generating circuit 18 in the embodiment shown in FIG. 3. The primary-current phase command $\theta_1^*$ and the amplitude command $|I_1^*|$ are generated by the circuit 18 in which the phase commands $\theta_T^*$ and $\theta_s^*$ and the rotational angle $\theta_r$ of the induction motor are added by an adder 189 to generate the primary-current phase command $\theta_1^*$.

Note that the rotational angle $\theta_r$ can be detected by integrating the rotational speed $\omega_r$ by means of an integrator 188, or it can be directly detected by using, for example, a resolver as the rotation detector 2.

Figure 8:
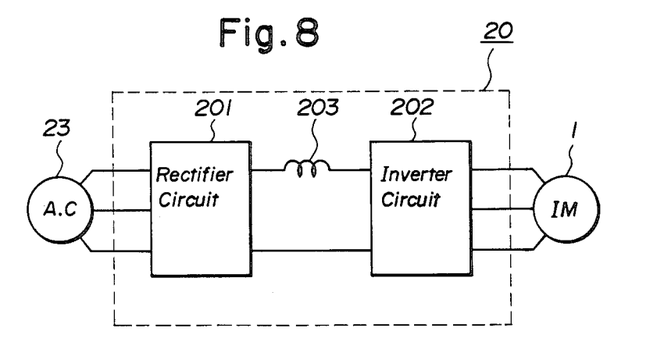
FIGS. 8 and 9 show block diagrams illustrating examples of a variable frequency-power converter circuit in the embodiment shown in FIG. 3.

FIG. 8 shows an example of the variable frequency-power converter unit 20 in the embodiment shown in FIG. 3. In FIG. 8, there are shown a 3-phase A.C. power source 23, a rectifier circuit 201, an inverter circuit 202, and a D.C. reactor 203. The amplitude of the primary current applied to the induction motor 1 is controlled by the rectifier circuit 201, and the phase of the primary current is controlled by the inverter circuit 202.

Figure 9:
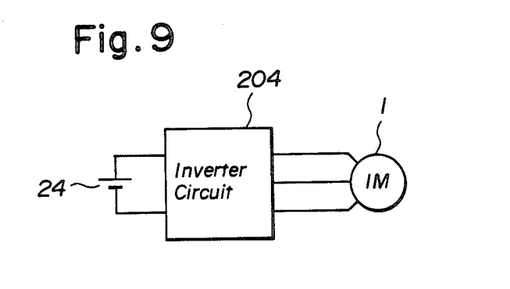

FIG. 9 shows another example of the variable frequency-power converter unit 20 in the embodiment shown in FIG. 3. In FIG. 9, there are shown a D.C. power source 24 and a transistor type of inverter circuit 204 which uses a power transistor as a switching element.

Figure 10:
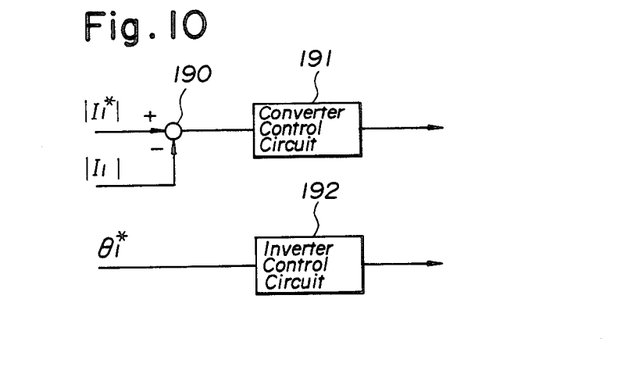
FIGS. 10 and 11 show examples of a current control circuit in the embodiment shown in FIG. 3.

FIG. 10 shows an example of the current control circuit 19 in the embodiment shown in FIG. 3, which may be adapted to control the primary current of the induction motor 1 by means of the variable frequency-power converter unit 20 as shown in FIG. 8. As shown in FIG. 10, the amplitude $|I_1|$ of the primary current (i.e., the D.C. current flow through the D.C. reactor 203 in FIG. 8), which is detected by a D.C. current detector (not shown), and the amplitude command $|I_1^*|$ are applied to a subtracter 190 to generate a difference therebetween. A converter control circuit 191 receives the difference or output signal from the subtracter 190 and outputs a control signal which is applied to the converter circuit 201 (FIG. 8) so as to reduce the difference to zero.

An inverter control circuit 192 receives the primary-current phase command $\theta_1^*$ and outputs a control signal which is applied to the inverter circuit 202 (FIG. 8) so as to make the primary-current phase which is applied to the induction motor 1 coincide with the command $\theta_1^*$.

Figure 11:
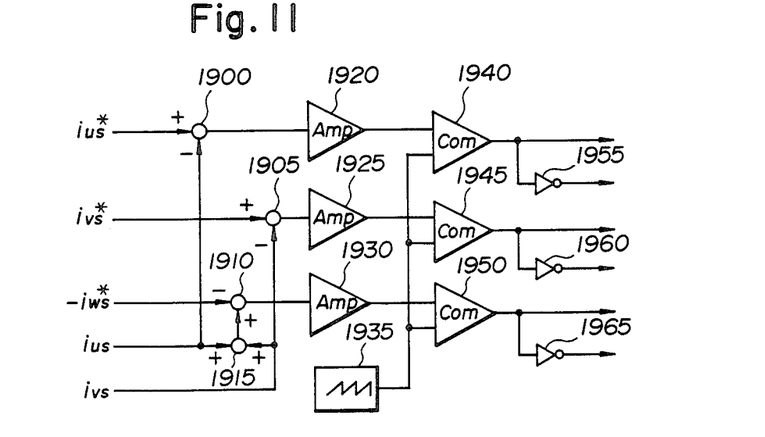

FIG. 11 shows another example of the current control circuit 19 in the embodiment shown in FIG. 3, which may be adapted to control the primary current applied to the induction motor 1 by means of the variable frequency-power converter circuit 20 shown in FIG. 9. In FIG. 11, there are shown subtracters 1900, 1905, and 1910, an adder 1915, amplifiers 1920, 1925, and 1930, a saw-tooth generation circuit 1935, comparators 1940, 1945, and 1950, and NOT circuits 1955, 1960, and 1965.

The operation of the current control circuit 19 will next be explained.

When the u-phase primary current $i_{us}$ of the induction motor 1 is controlled, the difference between the primary-current command $i_{us}^*$ and the actual primary current $i_{us}$ is output from the subtracter 1900 and is then amplified by the amplifier 1920 to obtain the u-phase primary-voltage command $v_{us}^*$. In the same manner, the v-phase primary-voltage command $v_{vs}^*$ and the w-phase primary-voltage command $v_{ws}^*$ can be obtained.

The primary-voltage commands $v_{us}^*$, $v_{vs}^*$, and $v_{ws}^*$ are converted into the corresponding control signals which are applied to the transistor-type inverter circuit 204 (in FIG. 9), by means of the saw-tooth generation circuit 1935, the comparators 1940, 1945, and 1950, and the NOT circuits 1955, 1960, and 1965. As a result, the primary voltages $v_{us}$, $v_{vs}$, and $v_{ws}$ are applied to the induction motor 1, so that each of the voltages causing the differences in current become zero.

Figure 12:
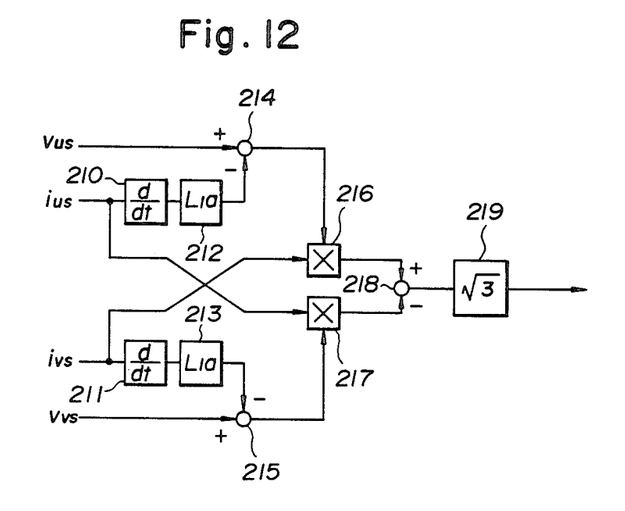
FIG. 12 shows an example of a power arithmetic circuit in the embodiment shown in FIG. 3.

FIG. 12 shows an example of the power arithmetic circuit 21 in the embodiment shown in FIG. 3. In FIG. 12, there are shown differentiators 210 and 211, subtracters 214, 215 and 218, multipliers 216 and 217, and coefficient multipliers 212, 213, and 219. This circuit performs the operation of the formula (17) to calculate the electric energy which is associated with the reactive power generated in the induction motor 1.

Note that, if the current control circuit 19 shown in FIG. 11 is adopted, the primary-voltage commands which are applied to the induction motor 1 can be obtained as output signals from the amplifiers 1920, 1925, and 1930 and those primary-voltage commands $v_{us}^*$ and $v_{vs}^*$ can be used in the circuit shown in FIG. 12, instead of the actual primary voltages $v_{us}$ and $v_{vs}$.

Prior to the explanation with respect to the construction of the power presumption circuit 22 in the embodiment shown in FIG. 3, the principle of the power presumption will next be explained.

As is known, the voltage equations of the rotor or secondary side of an induction motor on the stator (d-q axis) coordinate system are given by:

$$\begin{cases} (R_2 + PL_2)\Phi_{2d} - MR_2 i_{ds} + L_2\omega_r\Phi_{2q} = 0 \\ (R_2 + PL_2)\Phi_{2q} - MR_2 i_{qs} + L_2\omega_r\Phi_{2d} = 0 \end{cases} \quad (19)$$

In order to transform the formulas (19) into a rotary coordinate system rotating at an angular velocity of $\omega_o$, which is defined as a $d^e - q^e$ coordinate system, the following coordinate rotational relationship is used:

$$\begin{cases} i_{ds} = i_{ds}^e \cos\theta_o + i_{qs}^e \sin\theta_o \\ i_{qs} = i_{ds}^e \sin\theta_o + i_{qs}^e \cos\theta_o \end{cases} \quad (20)$$

$$\begin{cases} \Phi_{2d} = \Phi_{2d}^e \cos\theta_o - \Phi_{2q}^e \sin\theta_o \\ \Phi_{2q} = \Phi_{2d}^e \sin\theta_o + \Phi_{2q}^e \cos\theta_o \end{cases} \quad (21)$$

where $$\theta_o = \int \omega_o \, dt. \quad (22)$$

By substituting the formulas (20) and (21) into the formulas (19) to remove $i_{ds}$, $i_{qs}$, $\Phi_{2d}$, and $\Phi_{2q}$, the following can be obtained:

$$(R_2+PL_2)\Phi_{2d}^e - MR_2 i_{ds}^e - L_2(\omega_o-\omega_r)\Phi_{2q}^e = 0 \quad (23)$$

$$(R_2+PL_2)\Phi_{2q}^e - MR_2 i_{qs}^e + L_2(\omega_o-\omega_r)\Phi_{2d}^e = 0 \quad (24)$$

The condition under which $\Phi_{2q}^e = 0$, is obtained. If $\Phi_{2q}^e = 0$ is substituted into the formulas (23) and (24) then, from the formula (23):

$$\Phi_{2d}^e = \frac{M}{1 + PT_2} i_{ds}^e \quad (25)$$

and from the formula (24):

$$\omega_o = \omega_r + \frac{M}{T_2} \cdot \frac{i_{qs}^e}{\Phi_{2d}^e} \quad (26)$$

where $T_2 = L_2/R_2$.

Therefore $\Phi_{2q}^e$ can equal zero if the angular velocity $\omega_o$ on the rotary coordinate system is given by the formula (26). It is apparent from the formula (26) that $\omega_r$, $i_{qs}^e$, and $\Phi_{2d}^e$ are required to obtain the angular velocity $\omega_o$ and, from the formula (25), that the secondary flux $\Phi_{2d}^e$ can be given by $i_{ds}^e$ alone.

In addition, the excitation-current component $i_{ds}^e$ and the torque-current component $i_{qs}^e$ can be obtained from the d-axis and q-axis components $i_{ds}$ and $i_{qs}$, respectively, of the primary current of the following transformation formulas (27) (which are the reverse transforms of the formulas (16)):

$$\begin{cases} i^e_{ds} = i_{ds}\cos\theta_o + i_{qs}\sin\theta_o \\ i^e_{qs} = -i_{ds}\sin\theta_o + i_{qs}\cos\theta_o \end{cases} \quad (27)$$

where $i_{ds}$ and $i_{qs}$ can be obtained from the primary currents $i_{us}$ and $i_{vs}$, respectively, of the induction motor in accordance with the formulas (16).

It can be understood from the description above that the secondary flux $\Phi_{2d}{}^e$, the excitation-current component $i_{ds}{}^e$, and the torque-current component $i_{qs}{}^e$ can each be computed from the primary current $i_{us}$ of the induction motor and the rotational speed $\omega_r$.

Thus, by using $\Phi_{2d}{}^e$, $i_{ds}{}^e$ and $i_{qs}{}^e$, the electric energy $\hat{F}_o$ of the formula (18) can be rewritten as follows:

$$\hat{F}_o = \frac{M^*}{L_2^*}(i^e_{qs}P\Phi^e_{2d} - \omega_o\, i^e_{ds}\,\Phi^e_{2d}) \quad (28)$$

As can be understood from the formulae (25) through (27), the secondary winding inductance $L_2$, the primary and secondary winding mutual inductance $M$, and the secondary winding resistance $R_2$ are used in the calculation formula for the electric energy $\hat{F}_o$, as the numerical constants of the induction motor. It can be understood, therefore, that the value of the electric energy $\hat{F}_o$ is influenced by changes in the secondary winding resistance $R_2$ in response to changes in temperature.

Figure 13:
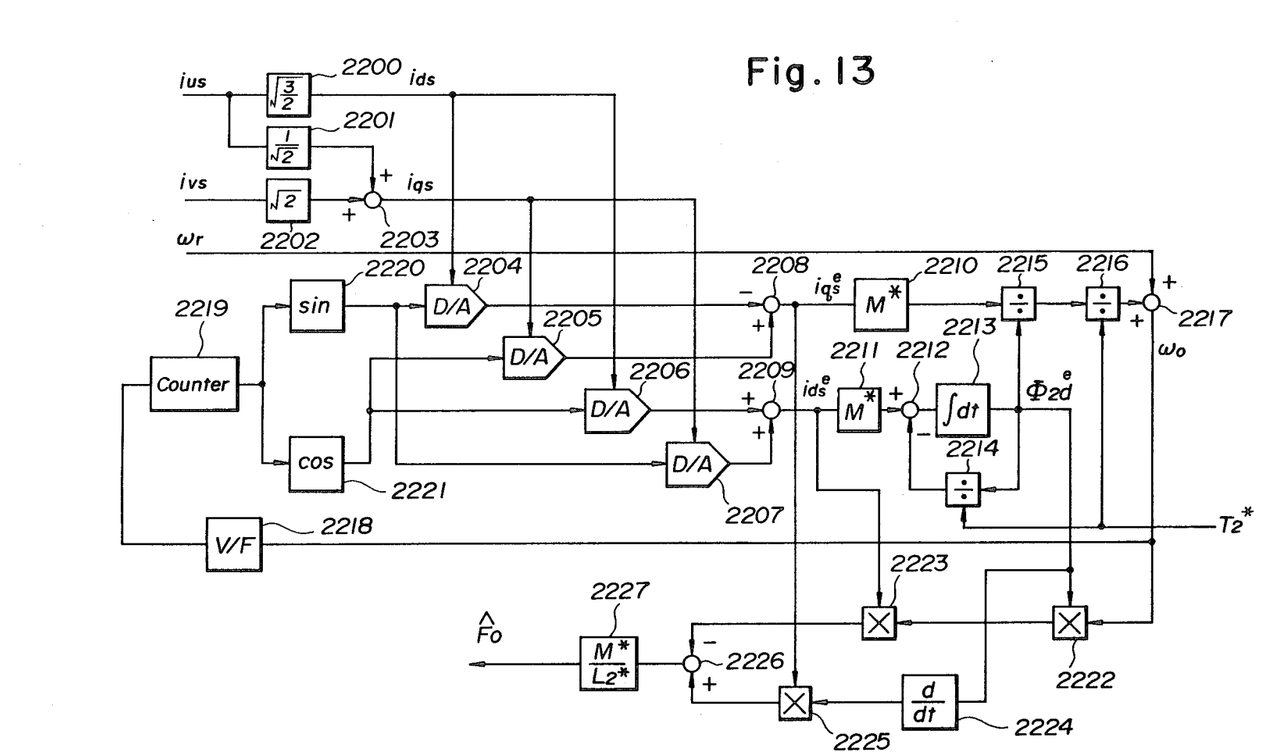
FIG. 13 shows an example of a power presumption circuit in the embodiment shown in FIG. 3.

FIG. 13 shows an example of the power presumption circuit 22 in the embodiment shown in FIG. 3. In FIG. 13, there are shown coefficient multipliers 2200, 2201, 2202, 2210, 2211, and 2227; adders 2203, 2209, and 2217; subtracters 2208, 2212, and 2226; D/A converters 2204, 2205, 2206, and 2207, which each have a multiplying function as well; dividers 2214, 2215, and 2216; multipliers 2222, 2223, and 2225; an integrator 2213; a differentiator 2224; a V/F converter 2218; a counter 2219; and ROMs 2220 and 2221.

The operation of the circuit shown in FIG. 13 will next be explained.

First, the d-axis and q-axis components $i_{ds}$ and $i_{qs}$ of the primary current are respectively ouputted from the coefficient multiplier 2200 and the adder 2203 by performing the calculation of the formula (16).

Second, in order to perform the calculation of the formula (27), the sine wave signal $\sin\theta_o$, which is readout from the ROM 2220, is applied to each of the D/A converters 2204 and 2206 in which the signal $\sin\theta_o$ is multiplied by $i_{ds}$; while the cosine wave signal $\cos\theta_o$, which is read-out from the ROM 2221 is applied to each of the D/A converters 2205 and 2207 in which the signal $\cos\theta_o$ is multiplied by $i_{qs}$; and then the output signals from the D/A converters 2204 and 2205 are operated on by the subtracter 2208 to output $i_{qs}{}^e$ therefrom; while the output signals from the D/A converters 2206 and 2207 are operated on by the adder 2209 to output $i_{ds}{}^e$ therefrom.

Next, in order to obtain the secondary flux $\Phi_{2d}{}^e$ from the excitation-current component $i_{ds}{}^e$, the calculation of the formula (25) is performed by the coefficient multiplier 2211, the subtracter 2212, the integrator 2213, and the divider 2214.

In addition, the excitation-current component $i_{qs}{}^e$ and the secondary flux $\Phi_{2d}{}^e$, which are respectively outputted from the subtracter 2208 and the integrator 2213, are operated on by the coefficient multiplier 2210 and the dividers 2215 and 2216 so that the quantity $$\frac{M^*}{T_2^*} \cdot \frac{i^e_{qs}}{\Phi^e_{2d}}$$

is outputted from the divider 2216 and therefore the calculation of the formula (26) can be completely performed by the adder 2217, which acts to add the rotational speed $\omega_r$ of the induction motor to the quantity $$\frac{M^*}{T_2^*} \cdot \frac{i^e_{qs}}{\Phi^e_{2d}},$$

to obtain the angular velocity $\omega_o$.

Finally, the angular velocity $\omega_o$ is applied to the V/F converter 2218 which outputs a train of pulses proportional to the magnitude of the angular velocity $\omega_o$. The train of pulses is counted by the counter 2219 to obtain the phase $\theta_o$ of the rotary coordinate axis in accordance with the formula (22).

Thus, when the ROMs 2220 and 2221, in which the values of the sine wave signal $\sin\theta_o$ and the cosine wave signal $\cos\theta_o$ are stored, are addressed by the output signal from the counter 2219, the digital values of the signals $\sin\theta_o$ and $\cos\theta_o$ are outputted therefrom.

According to the operations described above, the secondary flux $\Phi_{2d}{}^e$, the excitation-current component $i_{ds}{}^e$, the torque-current component $i_{qs}{}^e$, and the angular velocity $\omega_o$, all of which are required for the computation of the electric energy $\hat{F}_o$, can be obtained. It can be understood, therefore, that the electric energy $\hat{F}_o$ given by the formula (28) can be calculated by the subtracter 2226 and the coefficient multiplier 2227 because the quantity $\omega_o i_{ds}{}^e \Phi_{2d}{}^e$ of the formula is calculated by the multipliers 2222 and 2223, and the quantity $i_{qs}{}^e P\Phi_{2d}{}^e$ is calculated by the differentiator 2224 and the multiplier 2225.

As the result of the operations described above, the electric energies $F_o$ and $\hat{F}_o$ are applied to, for example, the compensation circuit 14 shown in FIG. 2. Since the numerical constant $T_2^*$, which has a value which coincides with the actual constant of the induction motor is outputted from the circuit 14, it is possible to correct both the numerical constant of induction motor $T_2^*$ in the power presumption circuit 22 and numerical constant $T_2^*$ in the current-vector arithmetic circuit 17 by using that value.

It is a matter of course that if the primary-voltage commands $v_{us}{}^*$ and $v_{vs}{}^*$ are used in the power arithmetic circuit shown in FIG. 12, then the values of the commands $v_{us}{}^*$ and $v_{vs}{}^*$ must be corrected in response to voltage fluctuations in the power source, because the values of the commands $v_{us}{}^*$ and $v_{vs}{}^*$ are influenced by the voltage fluctuations.

It is also a matter of course that, if the secondary flux is changed, the values of the inductances must be compensated for the effects of magnetic saturation because, in the power arithmetic circuit shown in FIG. 12 and the power presumption circuit shown in FIG. 13, the values of the primary-winding inductance $L_1$, the secondary-winding inductance $L_2$, and the primary- and secondary-winding mutual inductance $M$ are influenced by the magnetic saturation.

Although the preferred embodiments have been described in detail herein, it will be apparent to those skilled in the art that numerous modifications and substitutions may be made within the scope of the invention. In particular, although the embodiments above have been explained with respect to the control system for the induction motor, it will now be apparent that the system comprising the circuits shown in FIGS. 2, 12 and 13 may be utilized as operation monitor means for an induction motor control system, because the present system can be operated as a circuit for measuring the value of the secondary-winding resistance of an induction motor.

What is claimed is:

1. In a control system for a multi-phase induction motor with multiple windings, said system having power converter means for driving the motor, command generator means responsive to torque and excitation current setpoint commands for controlling said power converter means to drive said motor to produce a predetermined output torque and flux, a rotation detector for detecting the rotational speed of the motor, means responsive to the primary currents of said motor for generating primary current signals proportional thereto, and means responsive to the primary voltage of said motor for generating primary voltage signals proportional thereto, the improvement comprising means responsive to said priamry current siganls and to said primary voltage signals for calculating an energy function signal which is independent of the value of the secondary winding resistance, means responsive only to the primary currents and to the rotational speed of said motor of generating a presumed power function signal which depends on the value of the secondary winding resistance where the presumed power function signal is determined by the formula:

$$\hat{F}_o = \frac{M^*}{L_2^*} (i_{qs}^e P \Phi_{2d}^e - \omega_o i_{ds}^e \Phi_{2d}^e)$$

where

M* is the primary/secondary mutual inductance motor constant assumed for calculation, L$_2$* is the secondary winding inductance motor constant assumed for calculation, $\omega_o = \omega r + M^*/T_2^* \, i_{qs}^e/\Phi_{2d}^e$, $\omega_r$ is the measured motor rotational speed,

T$_2$* = R$_2$*/L$_2$*,

R$_2$* = the secondary winding resistance assumed for calculation,

P = the differential operator (d/dt)

$\Phi_{2d}^e = M^*/(1+pT_2^*) \, i_{ds}^e$, $i_{ds}^e = i_{ds} \cos \theta_o + i_{qs} \sin \theta_o$ $i_{qs}^e = -i_{ds} \sin \theta_o + i_{qs} \cos \theta_o$ $\theta_o = \int \omega_o dt$ $i_{ds} = \sqrt{3/2} \, i_{us}$ $i_{qs} = 1/\sqrt{2} i_{us} + \sqrt{2} i_{vs}$ i$_{us}$ and i$_{vs}$ are the measured motor primary currents, and correction means comprising means for forming the difference of said energy function signal and said presumed power function signal, means responsive to said difference for generating an integrated difference signal and means responsive to said integrated difference signal and to a command setpoint signal for generating a correction signal, said correction signal causing said command generator means to control said induction motor to produce a predetermined output torque and flux independent of the value of said secondary winding resistance.

2. A control system for an induction motor comprising:

current command generating circuit means responsive to command values of output torque and secondary flux for generating a torque current command and an excitation current command;

current-vector arithmetic circuit means responsive to said torque current command and to said excitation current command for computing a primary current amplitude command, a phase command and a slip angle frequency command in accordance with a functional relationship based on assumed numerical constants of the induction motor;

rotation detecting means responsive to the rotational speed of said induction motor for generating a rotational output signal;

a current command generator means responsive to said primary current amplitude command, to said phase command, to said skip angle frequency command and to said rotational speed output for generating primary current command values;

primary current detector means for detecting the actual primary current values of said induction motor and generating a primary current signal;

current control circuit means responsive to said primary current command values and to said primary current signal for generating motor control signals;

variable frequency-power converter means responsive to said motor control signals for driving said induction motor by means of variable frequencies;

primary voltage detector means for detecting the actual primary voltage values of said induction motor and for generating a primary voltage signal;

power arithmetic circuit means responsive to said primary current signal and to said primary voltage signal for computing an output signal representing an electric energy associated with a reactive power which is generated in said induction motor in accordance with a formula which depends on numerical constants assumed for said induction motor, but which computed energy does not depend on the secondary winding resistance;

power presumption circuit means responsive to said primary current signal and to said rotational speed signal and motor constants assumed for the purposes of calculation including the inductance of the primary winding, the inductance of the secondary winding, the resistance of the secondary winding and the mutual primary/secondary inductance, for calculating an electric energy, F$_o$, associated with a reactive power generated in said induction motor, in accordance with the following formula:

$$\hat{F}_o = \frac{M^*}{L_2^*} (i_{qs}^e P \Phi_{2d}^e - \omega_o i_{ds}^e \Phi_{2d}^e)$$

where

M* is the primary/secondary mutual inductance motor constant assumed for calculation, L$_2$* is the secondary winding inductance motor constant assumed for calculation.

$\omega_o = \omega r + M^*/T_2^* \, i_{qs}^e/\Phi_{2d}^e$, $\omega_r$ is the measured motor rotational speed,

T$_2$* = R$_2$*/L$_2$*, $R_2^*$ = the secondary winding resistance assumed for calculation, P = the differential operator (d/dt)

$\Phi_{2d}^e = M^*/(1+pT_2^*) \, i_{ds}^e$, $i_{ds}^e = i_{ds} \cos\theta_o + i_{qs} \sin\theta_o$ $i_{qs}^e = -i_{ds} \sin\theta_o + i_{qs} \cos\theta_o$ $\theta_o = \int \omega_o dt$ $i_{ds} = \sqrt{3/2} \, i_{us}$ $i_{qs} = 1/\sqrt{2} i_{us} + \sqrt{2} i_{vs}$ $i_{us}$ and $i_{vs}$ are the measured motor primary currents, and compensation circuit means for making comparison between the output signal of said power arithmetic circuit means and the output signal of said power presumption circuit means and for generating a correction signal in response to the comparison which correction signal is applied to said current vector arithmetic circuit means to compensate for changes in both the numerical motor constants assumed in the power presumption circuit means calculation and the numerical motor constants assumed in the calculation in current-vector arithmetic circuit means calculation.

* * * * *